United States Patent [19]

Boscher et al.

[11] Patent Number: 5,608,827
[45] Date of Patent: Mar. 4, 1997

[54] MULTICORE FIBER CONNECTION COMPONENT AND METHOD OF MAKING IT

[75] Inventors: Daniel Boscher; Jean-Charles Brault, both of Trebeurden; Jean-Michel Landouar, Locquemeau, all of France

[73] Assignee: France Telecom, France

[21] Appl. No.: 409,193

[22] Filed: Mar. 23, 1995

[30] Foreign Application Priority Data

Mar. 24, 1994 [FR] France ................................... 94 03466

[51] Int. Cl.⁶ ........................................................ G02B 6/38
[52] U.S. Cl. ................................ 385/55; 385/59; 385/65; 385/83
[58] Field of Search ................................ 385/55, 56, 59, 385/62, 63, 65, 71, 83

[56] References Cited

U.S. PATENT DOCUMENTS

| | | | |
|---|---|---|---|
| 4,028,162 | 6/1977 | Cherin et al. | 156/158 |
| 4,203,650 | 5/1980 | Millet et al. | 385/54 |
| 4,252,407 | 2/1981 | Bubanko et al. | 385/59 |
| 4,341,439 | 7/1982 | Hodge | 385/59 |
| 4,562,632 | 1/1986 | Parchet et al. | 385/83 X |
| 4,720,161 | 1/1988 | Malavieille | 385/51 X |
| 4,730,891 | 3/1988 | Poorman | 385/74 |
| 5,166,993 | 11/1992 | Blyler, Jr. et al. | 385/65 X |
| 5,305,409 | 4/1994 | Fujikawa et al. | 385/95 |
| 5,416,882 | 5/1995 | Hakoun et al. | 385/136 |

FOREIGN PATENT DOCUMENTS

| | | | |
|---|---|---|---|
| A-0107989 | 9/1983 | European Pat. Off. | |
| 2394823 | 6/1977 | France | |
| 2565581 | 6/1984 | France | |
| 2701571 | 2/1993 | France | |
| A-4202931 | 8/1993 | Germany | |
| 55-65914 | 5/1980 | Japan | 385/65 |
| 57-73711 | 5/1982 | Japan | 385/65 |
| 63-249116 | 10/1988 | Japan | 385/65 |
| 7902003 | 9/1979 | Netherlands | 385/65 |

*Primary Examiner*—Brian Healy
*Assistant Examiner*—Hemang Sanghavi
*Attorney, Agent, or Firm*—Blakely Sokoloff Taylor & Zafman

[57] ABSTRACT

A component for making a connection to a fiber with n cores disposed in a square geometry comprises n fibers assembled together at a common end and independent at their other end. The n fibers are assembled together at their common end in a geometry such that their cores are disposed in the same geometry as the cores of the multicore fiber. They are attached at their common end to a member enabling manipulation and/or positioning of the component.

5 Claims, 3 Drawing Sheets

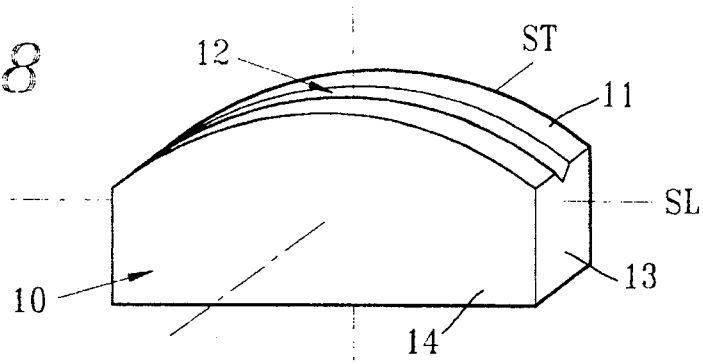
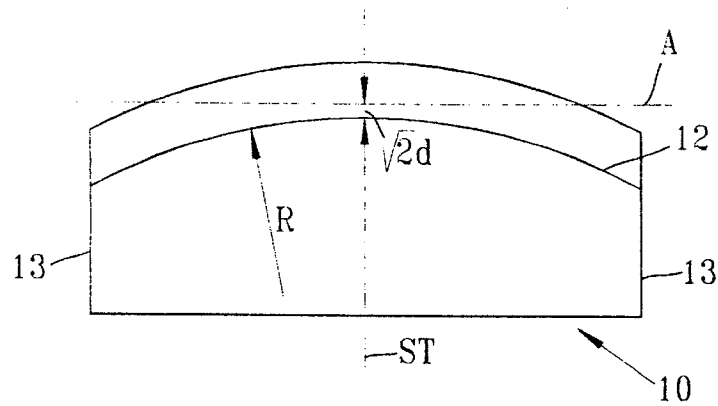
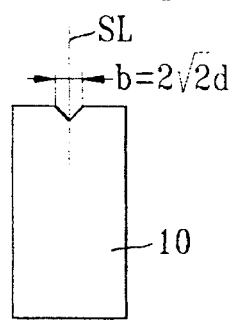
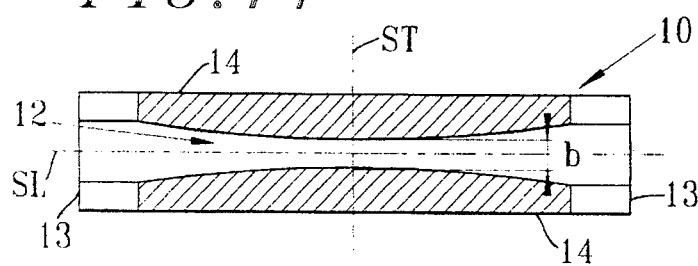
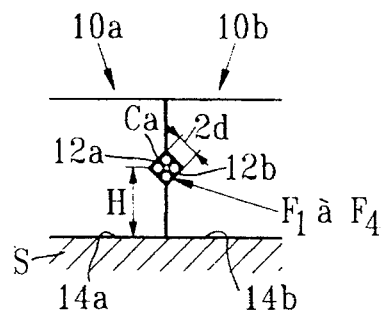
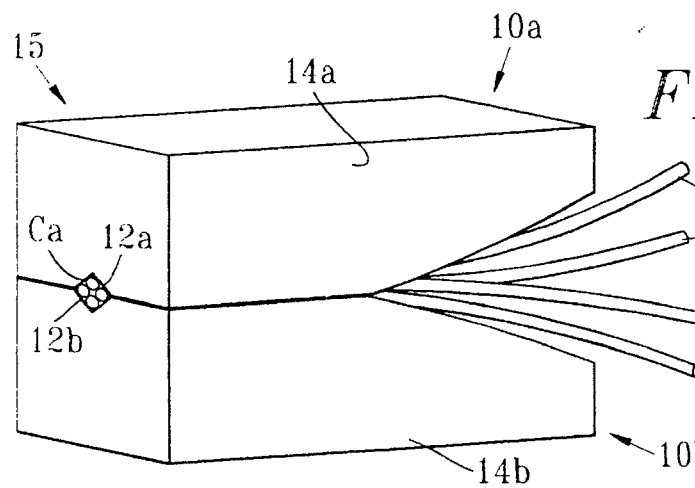

MULTICORE FIBER CONNECTION COMPONENT AND METHOD OF MAKING IT

BACKGROUND OF THE INVENTION

1. Field of the Invention

The present invention concerns a component for connecting a plurality of optical fibers to a multicore optical fiber and a method of making a component of this kind.

2. Description of the Prior Art

Multicore optical fibers are optical waveguides comprising a plurality of parallel waveguide cores in a common linear matrix.

The recent French patent application No 93/01674 proposes an optical waveguide having a plurality of cores in a common matrix, each core surrounded by optical cladding. The axes of the cores are disposed in the matrix so that the geometrical relationships between them are extremely precise, the respective positions of the axes of the cores being defined to within a few tenths of a micrometer.

FIG. 1 shows one example of an optical fiber F of this type. This fiber F comprises, in a matrix M, four optical waveguides $G_1$ through $G_4$ whose axes $X_1$ through $X_4$ form, in transverse section, the corners of an extremely precise square $C_1$. The contours of the matrix M are defined by four identical portions $R_1$ through $R_4$ of cylinders of revolution, the axes of which respectively coincide with the axes $X_1$ through $X_4$ of the optical waveguides.

This multicore fiber F has a maximal outside diameter D equal to 125 µm, for example, the width d of the square $C_1$ being 44.19 µm, the radius r of the cylindrical arcs $R_1$ through $R_4$ being equal to 31.25 µm.

Reserved until now primarily for long-haul transmission and trunk networks, fiber optics will be increasingly used in distribution networks with terminations in distribution chambers, in business premises and eventually in the home. As the number of customers connected by optical fiber increases, the overall economic aspect of the network becomes of capital importance.

Two types of architecture are feasible:

a shared type of architecture in which, using multiplexers, couplers and splitters, a single downward channel is used for many users, the transmission cost and the costs of the components and the fiber being divided by the number of users served by this single fiber;

an architecture using multicore fibers, with n waveguides connecting n users, which saves the cost of the multiplexers, couplers and splitters, which are all relatively costly components.

The cabling, installation and civil engineering costs being preponderant in cost calculations at present, there is nevertheless a trend towards this second type of architecture, i.e. to networks of multicore fibers.

As yet, no component for connecting a multicore fiber to individual fibers has been proposed.

One object of the invention is to propose a component of this kind, and a method of making it.

SUMMARY OF THE INVENTION

The invention consists in an optical connection component comprising a plurality of optical fibers each comprising at least one core surrounded by an optical cladding, said fibers being assembled at a common end to a support having at least one reference surface enabling positioning of said common end in at least one direction in space, said optical claddings of said fibers being tangential to each other at said common end, the axes of their cores being disposed at said common end in a geometry corresponding to that of a multicore fiber to which said common end is to be connected, said fibers being independent of each other at their opposite end.

In another aspect the invention consists in a method of making this connecting component, wherein:

a plurality of fibres are assembled so that optical claddings of said fibers are tangential to each other and so that axes of their cores are disposed in a geometry corresponding to that of a multicore fiber to which said component is to be connected, and said fibers assembled together in this way are fixed to a support having at least one reference surface.

In a first variant of this method:

said fibers are inserted into a U-section groove at least part of which is formed in an elastomer material part and closed by a reference support, the section of said groove being such that said optical claddings of said fibers, to which pressure is applied by virtue of the elasticity of said part, are located tangentially to each other and with their cores disposed in said geometry, said fibers are fixed to said support, said fibers and said support are removed from said groove.

Advantageously:

a multicore fiber to be connected to said connection component is inserted into said groove at the same time as said fibers so that it is aligned with said fibers in said groove which has a shape such that said multicore fiber is positioned in it with the axes of its cores coincident with the axes of the cores of said fibers, and said fibers and said multicore fiber are fixed to said support.

In a different variant of the method:

a one-piece block having a convex groove in a longitudinal plane of symmetry of said block is machined flat perpendicularly to said longitudinal plane of symmetry and to a transverse plane of symmetry of said block so as to obtain in said transverse plane of symmetry of said block a groove height equal to $\sqrt{2}d$ where d is the diameter of the optical claddings of said fibers to be assembled, said one-piece block having at least one reference surface parallel to its longitudinal plane of symmetry, said block is sawn apart in its transverse plane of symmetry, the two half-blocks thus obtained are placed together with the two reference half-surfaces in a common plane and with the sawn through ends of the two half-blocks coincident so that their grooves together define at said sawn ends a square cavity, said optical fibers are inserted into said square cavity and said two half-blocks and said fibers inserted therein are fixed together, the assembled two half-blocks defining a reference support for the assembled fibers.

In a third variant of the method of the invention:

an end-piece with dihedral surfaces is placed in an end-piece receiving groove of a precision transfer part of the type with dihedral grooves, said fibers to be assembled are inserted into said end-piece from one end thereof, exiting from the other end of said end-piece into a fiber receiving groove, said fiber receiving groove is closed by a punch having a complementary groove defining with said fiber receiving groove a generally square cavity, said fibers are positioned in said cavity using a binocular microscope, said fibers are fixed in said end-piece which provides a reference support.

Other features and advantages of the invention will emerge from the following description.

This description is given by way of non-limiting illustrative example only. It should be read in conjunction with the appended drawings.

BRIEF DESCRIPTION OF THE DRAWINGS

FIG. 8 is a perspective view of a part used in another variant of the method of the invention.

FIGS. 9, 10 and 11 are respectively views in longitudinal and transverse section and a plan view of the part from FIG. 8, showing a first step of this variant of the method.

FIG. 12 shows a second step of this method.

FIG. 13 is a perspective view of the connecting component produced by the method of FIGS. 9 through 12.

DETAILED DESCRIPTION OF THE PREFERRED EMBODIMENTS

Figure 1:
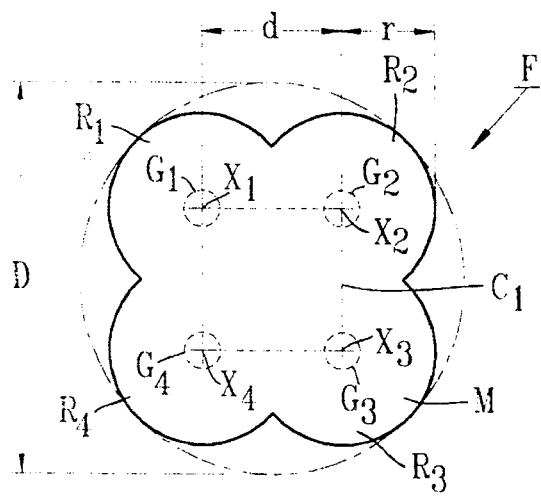
FIG. 1, already commented on, shows a fiber with four cores in transverse section.
Figure 2:
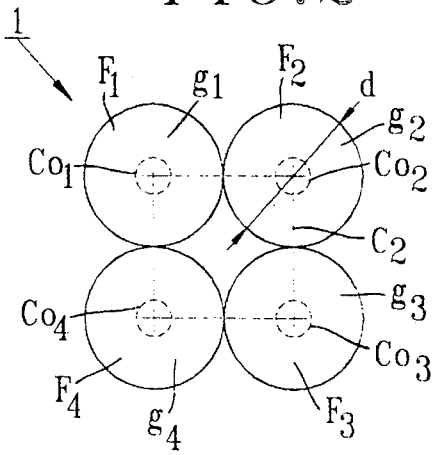
FIG. 2 shows, also in transverse section, the end of a connecting component in accordance with the invention adapted to be connected to the fiber with four cores from FIG. 1.
Figure 3:
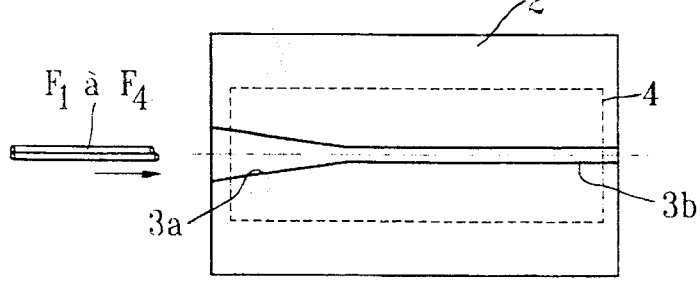
FIGS. 3 and 4 are top and transverse sectional views of means used in one embodiment of the method of the invention.
Figure 4:
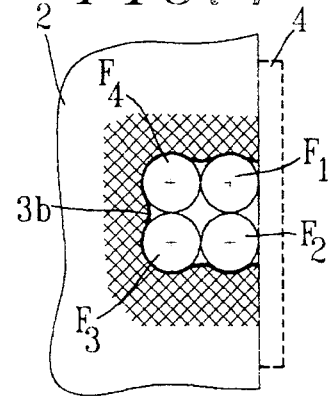

The connecting component 1 shown in cross-section in FIG. 2 connects the multicore fiber F from FIG. 1 to four individual fibers connected to four individual users.

This component 1 comprises four fibers $F_1$ through $F_4$ assembled together at a common end so that:

their cores $Co_1$ through $Co_4$ are disposed at this end with the same geometry as the cores of the multicore fiber F from FIG. 1, i.e. in a very precise square $C_2$ with a side length of 44.19 µm;

their optical claddings $g_1$ through $g_4$ are tangential to each other.

The fibers $F_1$ through $F_4$ are independent of each other at their other end.

A component 1 of this kind is adapted to be connected to the multicore fiber F at the end at which the fibers $F_1$ through $F_4$ are assembled together. At their opposite end the fibers $F_1$ through $F_4$ can be connected by conventional means to individual fibers.

At the end by which it is adapted to be connected to the multicore fiber F, the component 1 also has a support (not shown in FIG. 2) enabling it to be manipulated.

The diameter d of the optical claddings $g_1$ through $g_4$ at the common end of the fibers $F_1$ through $F_4$ is imposed by the square geometry of the cores $Co_1$ through $Co_4$ and is equal to 44.19 µm.

The fiber can be drawn directly to this diameter of 44.19 µm.

Alternatively, standard 125 µm fibers can be reduced to this diameter by abrasion or by chemical means.

In the case of silica fibers, for example, the chemical treatment can include immersion in a 40% hydrofluoric acid bath. On removal from the bath, the treated ends have a cylindrical shape whose diameter is, for a given temperature, a function of the immersion time. Other concentrations of hydrofluoric acid can of course be used.

Reference is now made to FIGS. 3 through 7 showing a first variant of the method of the invention.

This first variant of the method used an elastomer part 2 having a precision groove 3. A part 2 of this kind is usually employed for splicing two individual optical fibers.

The groove 3 has a very precise U-section central part $3b$ and a flared entry $3a$ via which the fibers $F_1$ through $F_4$ are fed into and guided along the central groove $3b$.

In a first step of this method, an adhesive that can be polymerized by ultraviolet light is deposited in the groove 3.

The groove 3 is then closed by a glass plate 4 supported by the upper part of the elastomer part 2.

The fibers $F_1$ through $F_4$ are then inserted simultaneously with the aid of a monocular microscope.

When the four fibers $F_1$ through $F_4$ have been inserted, the adhesive is polymerized by exposing it to ultraviolet light.

This glues the four fibers $F_1$ through $F_4$ to the glass plate 4.

After removal of the resulting assembly from the mold, the four fibers $F_1$ through $F_4$ are consolidated by coating them with glue or two-component resin.

The glass plate 4 is then sawn through to obtain prepared ends of the fibers $F_1$ through $F_4$.

Figure 5:
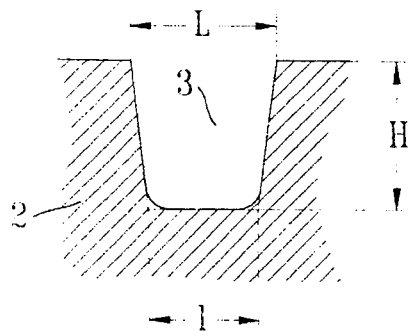
FIGS. 5 and 6 are views in transverse section of two types of groove that can be used in implementing the method of FIGS. 3 and 4.
Figure 6:
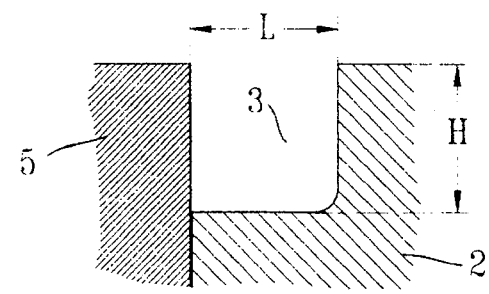

FIGS. 5 and 6 show two possible geometries for the groove 3.

In FIG. 5 the groove 3 is entirely formed in a one-piece block 2 of soft elastomer material and widens slightly from the bottom towards the open side. The height H and the width L at the top of the groove 2 are chosen to suit the material of the part 2 and the type of fiber used, so that said fibers $F_1$ through $F_4$ are pressed together as required. Typically:

L=0.85×2d, and

H=0.7×2d=l, where l is the width at the bottom of the groove 3 and d is the diameter of the fibers.

As an alternative to this, as shown in FIG. 6, the groove 3 is not defined in a one-piece block: the soft elastomer part 2 has an L-section rebate which defines the bottom and one lateral face of the groove 3. The other lateral face of the groove 3 is defined by a hard elastomer plate 5 pressed onto the soft elastomer part 2 and strictly perpendicular to the glass plate 4.

The height H and the width L are typically such that:

L=H=0.7×2d

The component 1 obtained in this way can then be connected by conventional means to the multicore fiber F.

The glass plate 4 provides a reference surface against which the fibers $F_1$ through $F_4$ are pressed.

Figure 7:
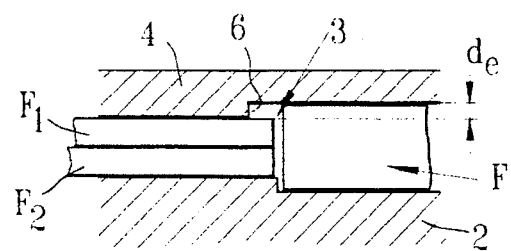
FIG. 7 is a view in longitudinal section showing the splice between a multicore fiber and a connecting component used in one variant of the method of FIGS. 3 and 4.

As an alternative to this, as shown in FIG. 7, the fibers $F_1$ through $F_4$ can be spliced directly to the multicore fiber F in the groove 3. To this end, the multicore fiber F is inserted into the groove 3 at the same time as the fibers $F_1$ through $F_4$, from the other end. The adhesive is polymerized with the fibers $F_1$ through $F_4$ and the fiber F all in place in the groove 2.

The difference between the external geometrical dimensions of the fibers $F_1$ through $F_4$ and the multicore fiber F is accommodated by a step 6 of height $d_e$ equal to r-d/2 (i.e. 9.15 μm) in the middle of the glass plate 4. The multicore fiber F and the fibers $F_1$ through $F_4$ are pressed against the plate 4 by the elasticity of the bottom of the groove 3, on either side of the step 6.

The step 6 can be formed by controlled chemical etching of a flat glass plate, for example, using 48% hydrofluoric acid for 25 seconds or dilute hydrofluoric acid for several minutes.

Alternatively, the multicore fiber can be chemically etched, in which case no step is required on the external plate.

The variant of the method of the invention just described has advantages including:

virtually negligible material costs, since the same elastomer part can be used many times, very short time to make each component.

Reference will now be made to FIGS. 8 through 12 which show another variant of the invention.

This variant uses convex grooved parts like the part 10 shown in FIG. 8.

This part 10 has a transverse plane of symmetry ST and a longitudinal plane of symmetry SL. Its contour is defined by:

a convex face 11 in which is formed a V-groove 12 symmetrical to both these planes, two reference faces 13 parallel to the lateral plane of symmetry, two reference faces 14 parallel to the longitudinal plane of symmetry.

The radius of curvature R of the V-groove 12 is constant.

The part 10 is molded from a low shrinkage resin.

Using a precision machine of the type described in French patent FR-A-2 565 581, for example, a precision cut is made through the convex surface 11 and the groove 12 in a sawing plane A (FIG. 9) perpendicular to the planes of symmetry of the part 10. The result of this is to reduce the size of the groove 12 in the transverse plane of symmetry ST to a height of $\sqrt{2}d$ and a width $b=\sqrt{2\times 2d}$. The machine described in FR-A-2 565 581 is accurate to within about 1 μm.

The part 10 is then cut in its transverse plane of symmetry ST.

Then, as shown in FIG. 12, the two half-parts 10a and 10b obtained in this way are placed and glued together so that their grooves 12a and 12b together define, at their cut ends, a precision square cavity Ca, the relative position of the longitudinal reference surfaces 14a and 14b of the two half-parts 10a and 10b being adjusted by pressing them against a common plane working surface S.

The side length of the precision square Ca obtained in this way is equal to 2d, where d is the diameter of the fibres $F_1$ through $F_4$.

The cavity Ca has a wide opening on the entry side for guiding the four fibers $F_1$ through $F_4$ into the square Ca.

Once the fibers $F_1$ through $F_4$ have been inserted, they are fixed into the cavity Ca with glue or resin. The fibers $F_1$ through $F_4$ are advantageously further coated by introducing resin into the cavity Ca in order to increase their mechanical strength.

The final component 15 obtained (FIG. 13) has four fibers $F_1$ through $F_4$ at 45° to the longitudinal reference surfaces 14a and 14b and at a defined height H from these surfaces, H being equal to half the width of the part 10. The component 15 can therefore be manipulated easily for connection by conventional means to a multicore fiber.

The cut ends of the fibers are prepared by sawing the component 14 or polishing their ends.

A third variant of the method of the invention will now be described.

Figure 14:
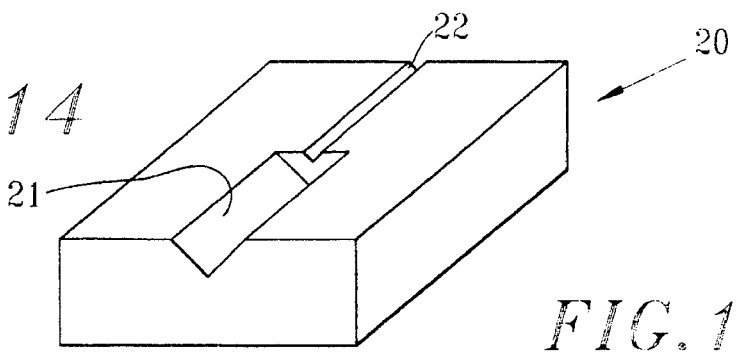
FIGS. 14 and 15 are perspective views of precision grooved parts which can be used in another variant of the method of the invention.
Figure 16:
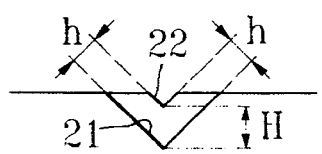
FIG. 16 is a diagrammatic view in transverse section of a part of the type shown in FIGS. 14 and 15, showing the relative positions of two precision grooves of a part of this kind.
Figure 15:
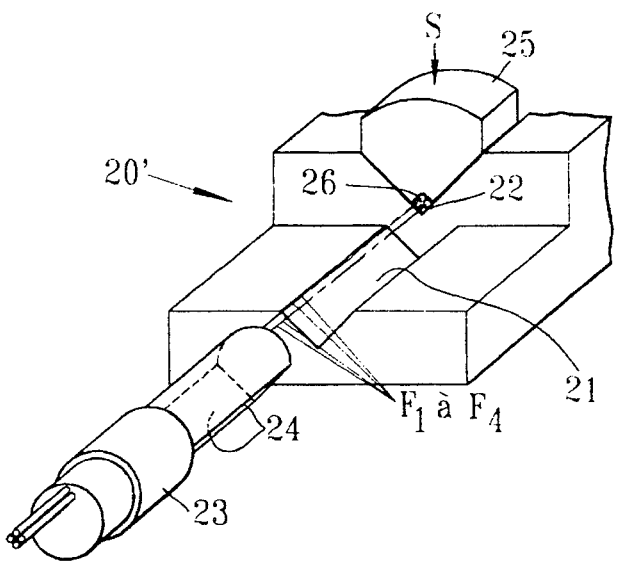

This variant uses precision transfer parts of the type described in French patent FR-A-2 394 823. Parts 20 and 20' of this kind are shown in FIGS. 14 and 15. A part of this kind includes two very precise V-section grooves 21 and 22 with a common plane of longitudinal symmetry, in alignment with each other and offset relative to each other by a height H (FIG. 16). The faces of the two grooves 21 and 22 are inclined at 45° to their plane of symmetry and are offset to each other by a height h equal to $H/\sqrt{2}$.

The larger groove 21 receives a tubular end-piece 23 having two dihedral faces 24 adapted to bear against the bearing surfaces defined by the faces of said groove 21.

The internal bore of the end-piece 23 is flared. It is square in cross-section and has a side length exceeding 500 μm at the entry end and exceeding 88 μm at the exit end. This bore guides the fibers and provides a reservoir for resin. It is positioned in the end-piece 23 in such a way that the four fibers $F_1$ through $F_4$ inserted in it can be pressed into the groove 22. With the end-piece 23 in place, the four fibers $F_1$ through $F_4$ are inserted into it from its end opposite that facing the smaller groove 22. The fibers exit the other end of the end-piece 23 to be positioned in said groove 22.

The end-piece 23 is then clamped against the bottom of its precision groove 21.

A punch 25 having an axial groove 26 the bearing surfaces of which are perpendicular to those of the groove 22 is applied to the fibers $F_1$ through $F_4$ in the second groove.

Figure 17:
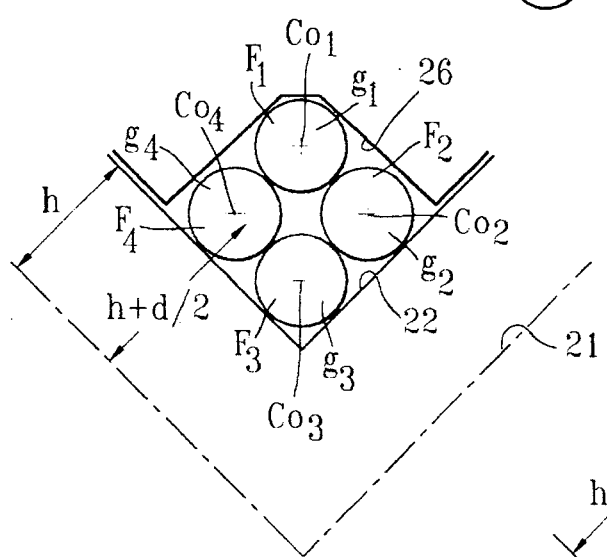
FIG. 17 is a view in transverse section showing the positioning of the fibers relative to these precision grooves.

Using a binocular microscope, the fibers $F_1$ through $F_4$ are positioned in the square cavity defined by the grooves 22 and 26 so that one is in the bottom of the groove 22, two others are tangential to this first fiber and bear against the bearing surfaces of the groove and the fourth rests on these other two (see FIG. 17).

To enable observation by means of a binocular microscope the equipment described in FR-A-2 394 823 has additional optical means (observation cabling, etc).

The cores $Co_1$ through $Co_4$ of the fibers $F_1$ through $F_4$ are then accurately located at a distance h+d/2 from the reference surfaces 24 of the end-piece 23.

The interior of the end-piece 23 is filled with resin to fix the position of the four fibers $F_1$ through $F_4$ relative to the reference surfaces 24, after which the front face of said end-piece is cut or polished.

The multifiber component obtained in this way can be connected to a multicore fiber F itself comprising a connection end-piece.

Figure 18:
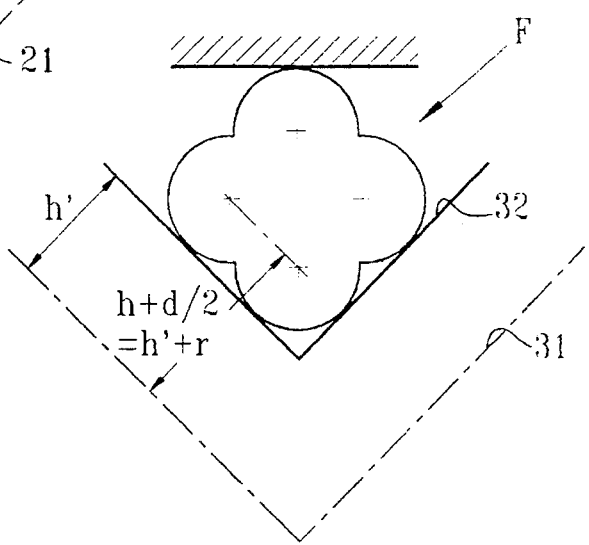
FIG. 18 shows the relative positions of the precision grooves of another part used to connect the connecting components made by the method of FIGS. 14 through 17 to the multicore fiber shown in FIG. 18.

The multicore fibre F is positioned in its end-piece (which is not shown in order to simplify the drawings) on another precision transfer part. This part 30 (FIG. 18) has a distance h' between the faces of its V-grooves 31 and 32 such that:

$$h+d/2=h'+r$$

that is:

$$h'=h+d/2-r$$

so that the disposition of the cores of the fiber F relative to the reference surfaces of its end-piece coincides with the disposition of the cores of the fibers $F_1$ through $F_4$ relative to the reference surfaces 24 of the end-piece 23.

After fixing the multicore fiber F into its end-piece with resin, the two end-pieces obtained in this way are disposed in the same 90° V-groove. Mechanical retention in two orthogonal directions perpendicular to the axes of the cores is sufficient to achieve a loss-free connection between the four fibers $F_1$ through $F_4$ and the multicore fiber F.

The connection step proper does not require any additional operation to optimize the relative positions of the fibers and the multicore fiber.

The invention has been described in the case of a connection to a fiber with four cores. It naturally applies in the same manner to connections of fibers with n cores, and in particular to connections of multicore fibers having n cores arranged in a square (three by three).

There is claimed:

1. Method for making a connecting component for the connection of $n^2$ fibers to a multicore fiber comprising $n^2$ cores, n being an integer, wherein:

a one-piece block having a convex groove in a longitudinal plane of symmetry of said block is machined flat perpendicularly to said longitudinal plane of symmetry and to a transverse plane of symmetry of said block so as to obtain in said transverse plane of symmetry of said block a groove height equal to $\sqrt{2}d$ where d is the diameter of the optical claddings of said fibers to be assembled, said one-piece block having at least one reference surface parallel to its longitudinal plane of symmetry, said block is sawn apart in said block's transverse plane of symmetry, the two part-blocks thus obtained are placed together with the two reference part-surfaces in a common plane and with the sawn through ends of the two part-blocks coincident so that grooves of the two-part blocks together define at said sawn ends a square cavity, said optical fibers are inserted into said square cavity and said two part-blocks and said fibers inserted therein are fixed together, the assembled two part-blocks defining a reference support for the assembled fibers.

2. Method according to claim 1 wherein:

a multicore fiber to be connected to said connection component is inserted into said groove at the same time as said fibers so that said multicore fiber is aligned with said fibers in said groove which has a shape such that said multicore fiber is positioned in said groove with the axes of said multicore fiber's cores coincident with the axes of the cores of said fibers, and said fibers and said multicore fiber are fixed to said support.

3. Method according to claim 2 wherein the face of said reference support facing the bottom of said groove incorporates a step to compensate for the different external dimensions of said multicore fiber and said assembled fibers.

4. Method according to claim 1 wherein a lateral face of said groove is defined by a hard elastomer part bearing on a soft elastomer part having an L-section rebate defining the bottom and the other lateral face of said groove.

5. Method according to claim 1 wherein said groove widens from its bottom towards its open side.

* * * * *